US012733655B2

(12) United States Patent
Both

(10) Patent No.: US 12,733,655 B2
(45) Date of Patent: Sep. 15, 2026

(54) POWDERED COMPOSITIONS CONTAINING AN EDIBLE OIL AND THEIR USE IN FOOD PRODUCTS

(71) Applicant: FrieslandCampina Nederland B.V., Amersfoort (NL)

(72) Inventor: Eline Marion Both, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 134 days.

(21) Appl. No.: 18/701,894

(22) PCT Filed: Oct. 20, 2022

(86) PCT No.: PCT/EP2022/079196
§ 371 (c)(1),
(2) Date: Apr. 16, 2024

(87) PCT Pub. No.: WO2023/067056
PCT Pub. Date: Apr. 27, 2023

(65) Prior Publication Data

US 2024/0397965 A1 Dec. 5, 2024

(30) Foreign Application Priority Data

Oct. 21, 2021 (EP) .................................... 21203880

(51) Int. Cl.
*A23D 7/005* (2006.01)
*A23C 9/152* (2006.01)
*A23C 9/20* (2006.01)
*A23D 7/04* (2006.01)
*A23L 33/00* (2016.01)

(52) U.S. Cl.
CPC .......... *A23D 7/0053* (2013.01); *A23C 9/1528* (2013.01); *A23C 9/203* (2013.01); *A23D 7/04* (2013.01); *A23L 33/40* (2016.08)

(58) Field of Classification Search
CPC ......... A23D 7/0053; A23D 7/04; A23L 33/40; A23C 9/1528; A23C 9/203
USPC ......................................................... 426/585
See application file for complete search history.

(56) References Cited

U.S. PATENT DOCUMENTS

2006/0068019 A1 3/2006 Dalziel
2008/0171720 A1* 7/2008 Garssen .................. A23L 33/40 514/49
2008/0206325 A1 8/2008 Bouquerand
2010/0092635 A1 4/2010 Van Seeventer
2011/0300204 A1 12/2011 Van Der Beek
2015/0237902 A1 8/2015 Rosado Loria

FOREIGN PATENT DOCUMENTS

| | | |
|---|---|---|
| CN | 108576820 | 9/2018 |
| CN | 110742275 | 2/2020 |
| JP | 2018191655 | 12/2018 |
| WO | 2006112716 | 10/2006 |
| WO | 2008108652 | 9/2008 |
| WO | 2012177135 | 12/2012 |
| WO | 2019121493 | 6/2019 |
| WO | 2023006894 | 2/2023 |

OTHER PUBLICATIONS

International Search Report and Written Opinion, date of mailing Feb. 16, 2023, International Application No. PCT/EP2022/079196 (8 pgs.).
Little Etoile Stage 4 Clinical Nutrition Optimum Growing Up Formula For Young Children From 2 To 6 Years, published Jun. 2021, 4 pgs.
Playford, Raymond John, et al.; “Bovine Colostrum: Its constituents and uses”, Nutrients, vol. 13, Issue 265, Jan. 18, 2021, pp. 1-23.
Souci, et al.; “Evidence of the composition of whole milk powder”, Food Composition and Nutrition Tables, 7th edition (2008), pp. 47-48.
Dande, Nivedita Deepak, et al.; “Nutritional composition of bovine colostrum: Palatability evaluation of food products prepared using bovine colostrum”, International Journal of Nutrition, Pharmacology, Neurological Diseases, vol. 10, Issue 1, Feb. 25, 2020, pp. 8-13.
Soyyilmaz, Buket, et al.; “The mean of milk: A review of human milk oligosaccharide concentrations throughout lactation”, Nutrients, vol. 13, Issue 2737, Aug. 9, 2021, pp. 1-22.
Keogh, M.K, et al.; “Stability to Oxidation of Spray-Dried Fish Oil Powder Microencapsulated Using Milk Ingredients”, Journal of Food Science, vol. 66, No. 2, 2001, pp. 217-224.
Notice of Opposition to European Patent No. EP4418866 on behalf of N.V. Nutricia, dated May 26, 2026, 20 pgs.

* cited by examiner

*Primary Examiner* — Brent T O’Hern
(74) *Attorney, Agent, or Firm* — Fitch, Even, Tabin & Flannery LLP

(57) ABSTRACT

Powder composition comprising. based on the total weight of the powder (i) 10-80 wt % of an oxidation sensitive edible oil, (ii) 5-30 wt % of at least one emulsifier selected from protein and starch, and (iii) 5-65 wt % galacto-oligosaccharide (GOS) and/or human milk oligosaccharide (HMO).

19 Claims, No Drawings

POWDERED COMPOSITIONS CONTAINING AN EDIBLE OIL AND THEIR USE IN FOOD PRODUCTS

CROSS REFERENCE TO RELATED APPLICATIONS

This application is a U.S. national phase application of International Application No. PCT/EP2022/079196, filed Oct. 20, 2022, which claims benefit from European Patent Application No. 21203880.6, filed Oct. 21, 2021, which are each hereby incorporated herein by reference in their entirety.

The present invention relates to edible oils—preferably comprising polyunsaturated fatty acids (PUFAs), more specifically long chain polyunsaturated fatty acids (LC-PUFAs)—in powder form, their preparation and use in food products, more in particular in infant formula.

Edible oils that contain unsaturated fatty acids and especially polyunsaturated fatty acids (PUFAs), usually in the form of glyceride esters, have been shown to have beneficial health effects. These health effects include reduction of cholesterol levels, protection against coronary heart disease and suppression of platelet aggregation. For example, fish oil, which contains the omega-3 and omega-6 fatty acids docosahexaenoic acid (DHA) and eicosapentaenoic acid (EPA), has been used in food products and in nutritional products for its health benefits.

It is furthermore known that the long chain polyunsaturated fatty acids (LC-PUFAs) arachidonic acid (ARA), docosahexanoic acid (DHA) improve the brain and eye development of infants and young children. Most infant formulae and follow-up formulae are therefore fortified with these LC-PUFAs.

Due to its unsaturated bonds, PUFAs have a tendency to undergo oxidation, especially during storage. The oxidation reaction products have an unpleasant taste and/or odor; an off-taste, which may be metallic, fish-like, or rancid. Hence, the shelf life and storage stability of these oils is relatively short.

It is known to improve the shelf-life of such oils by incorporating it in a matrix. The matrix stabilizes the oil against oxidation.

One such stabilization method is encapsulation in a matrix containing an emulsifier and a carbohydrate source.

Examples of emulsifiers are proteins, such as caseinate, soy protein, and whey protein.

Examples of carbohydrate sources are sugar alcohols such as mannitol, glucose syrup, lactose, and maltodextrin, whereby glucose syrup is the most conventional carbohydrate source used. The disadvantage of mannitol is that it has laxative affect and negatively affects the taste. Maltodextrin, on the other hand, undesirably affects the viscosity during processing. Lactose easily crystallizes, thereby expelling oil from the droplets formed during production of the encapsulates. And none of them, including glucose, are present in human breast milk or are otherwise desired in infant formulae. Hence, these carbohydrate sources are preferably not introduced into infant formulae.

Furthermore, the storage stability of the currently known encapsulated edible oils remains limited and there is a continuous desire to further improve the storage stability/shelf life of encapsulated edible oils. This extent of oxidation and, thus, the storage stability can be detected by an off taste and/or odor. Additionally or alternatively, it can be detected by measuring the peroxide value and/or anisidine value.

The aim of the present invention is therefore the provision of an encapsulated edible oil, preferably an encapsulated PUFA, more preferably an encapsulated LC-PUFA, comprising a carbohydrate source that is favorably added to infant formulae and which provides an improved storage stability and, as a result, better sensory properties.

It has now been found that the use of galacto-oligosaccharides (GOS) and/or human milk oligosaccharides (HMOs) as carbohydrate source solves these problems. GOS are non-digestible oligosaccharides that are favorably added to infant formulae because of their close resemblance to the oligosaccharides present in human breast milk and their proven benefits in (early-life) gut microbiota: growth promotion of beneficial bacteria, in particular bifidobacteria and lactobacilli, inhibition of pathogen adhesion, and improvement of gut barrier function.

Furthermore, it has been found that GOS-and/or HMO-containing encapsulates have higher storage stability than conventional glucose-based encapsulates or lactose-based encapsulates.

Human milk contains various non-digestible oligosaccharides. These oligosaccharides are a major element in the innate immune system provided by human milk. They serve an important role in the development of a healthy intestinal microbiome by promoting the growth of beneficial microbiota, such as bifidobacteria and lactobacilli, and in the prevention of the adhesion of pathogens and toxins.

The oligosaccharides present in human milk differ from those present in milk from domestic animals, such as cows. More than 100 different oligosaccharides are present in human milk, the most abundantly present ones are fucosylated lactoses such as 2'-fucosyllactose (2'-FL) and 3-fucosyllactose (3-FL), sialylated lactoses such as 3'-sialyllactose (3'-SL) and 6'-sialyllactose (6'-SL), and tetrasaccharides like lacto-N-tetraose (LNT) and lacto-N-neotetraose (LNnT). The most abundantly present human milk oligosaccharide (HMO) is 2'-FL.

The present invention therefore relates to a powder composition comprising, based on the total weight of the powder:

- 10-80 wt % of an oxidation sensitive edible oil,
- 5-30 wt % of at least one emulsifier selected from protein and starch, and
- 5-65 wt % galacto-oligosaccharide (GOS) or human milk oligosaccharide (HMO).

It should be noted that the use of GOS in algae oil DHA encapsulates has been described in CN 108576820. Apart from the oil and GOS, these encapsulates contain egg yolk lecithin as the emulsifier. Proteins and starch, as used in the present invention are, however, better emulsifiers than egg yolk lecithin and the present invention therefore provides an improved product.

The powder composition of the present invention preferably comprises the oxidation sensitive edible oil in an amount of from about 10 wt % to about 80 wt %, more preferably from about 15 wt % to about 60 wt %, even more preferably from about 20 wt % to about 55 wt %, based on the total weight of the powder composition.

The edible oil preferably comprises at least 10 wt %, more preferably at least 25 wt %, and most preferably at least 28 wt % of one or more carboxylic acids containing at least 18, more preferably 18-30, most preferably 18-24 carbon atoms and at least 2, more preferably 2-6 carbon-carbon double bonds, or an ester thereof.

These carboxylic acids may be in the form of free acids, esters, or mixtures of free acids (including salts thereof, such as sodium salts), and esters. Typically, the one or more carboxylic acids will be in the form of a complex mixture as present in or derived from a natural source. Examples of suitable carboxylic acids are docosahexaenoic acid (DHA), eicosapentaenoic acid (EPA), conjugated linoleic acid (CLA) (including the cis-9, trans-11 and trans-10, cis-12 isomers, and mixtures thereof), stearidonic acid, linoleic acid, alpha-linolenic acid (ALA), gamma-linolenic acid (GLA), arachidonic acid (ARA), and mixtures thereof. Preferably, the one or more carboxylic acids are selected from DHA, ARA, EPA and mixtures thereof. In a mixture of DHA and EPA, the components can be present at any ratio, but a weight ratio of DHA/EPA of 0.4 to 8.0 may be preferred for certain applications.

Suitable esters of said carboxylic acids include esters with aliphatic alcohols containing from one to six carbon atoms, such as ethyl esters. Other suitable esters include esters with alcohols and polyols that are acceptable in food products. Examples of other esters are mono-, di-, and tri-glycerides and mixtures thereof. Triglyceride esters are particularly preferred, typically as the major component (i.e., greater than 50% by weight) together with mono-and/or di-glycerides, for example up to 35 wt % diglycerides and up to 5 wt % monoglycerides.

Other components of the edible oil may include, for example, saturated carboxylic acids having from 12 to 30 carbon atoms, mono-unsaturated carboxylic acids having from 12 to 30 carbon atoms and mixtures thereof, typically as their esters, such as glyceride esters, e.g. triglycerides.

The term edible oil covers oils that are non-toxic and can be consumed as part of a normal diet. The edible oil is typically a liquid at 25° C. and atmospheric pressure and is preferably liquid within the temperature range of 0° C.-25° C. and atmospheric pressure. The oil is generally hydrophobic, meaning that it is substantially immiscible with water at a 1:1 weight ratio at 25°° C. The oil is preferably obtained or obtainable from a natural source, such as a vegetable oil, an animal oil (including fish oil) or animal fat, or a microbial oil, but may also be synthetic. The oil may be a mixture of oils from different sources or a mixture of a synthetic oil with one or more oils from natural sources.

It is particularly preferred that the edible oil is fish oil. The fish oil may be directly or indirectly obtainable from fish and may be, for example, a fish oil concentrate, a fractionated fish oil or a modified fish oil. Fish oils include oils from mackerel, trout, herring, tuna, salmon, cod, menhaden, bonito and sardines. Fish oil typically contains a mixture of omega-3 and omega-6 PUFAs as their triglycerides, together with other components. In a particularly preferred embodiment, the oil is a fish oil concentrate comprising at least 30 wt % DHA. Alternatively, also oils obtainable from fungi and algae containing high amounts of LCPUFAs may be used.

The edible oil preferably has a peroxide value of less than 10 meq/kg, preferably less than 9 meq/kg, more preferably less than 8 meq/kg, even more preferably less than 7 meq/kg, such as less than 6 or less than 5 meq/kg after storage in contact with air at 30° C. for 12 weeks up to 16 weeks.

The powder composition according to the present invention comprises at least one emulsifier selected from protein and starch. Also combinations of these emulsifiers can be used. This emusifier is present in the powder composition in an amount of 5-30 wt %, preferably 7-25 wt %, and most preferably 10-20 wt %.

Examples of suitable proteins are dairy proteins like caseinates and whey proteins, and plant proteins such as soy, pea, and potato proteins.

Examples of starches are emulsifying modified starches, such as starches modified by reaction with n-octenylsuccinyl anhydride (NOSA).

In, addition, the powder composition may further comprise antifoaming agents or emulsifying agents other than proteins or starches; such as monoglycerides, diglycerides.

The powder composition comprises 5-75 wt %, preferably 10-65 wt %, and most preferably 20-60 wt % galacto-oligosaccharide (GOS) and/or human milk oligosaccharide (HMO).

Galacto-oligosaccharide (GOS) is a complex mixture of carbohydrates with differing chain length, linkage type, and degree of branching. GOS preferably comprises 40-100 wt %, more preferably 50-90 wt %, and most preferably 55-80 wt % oligosaccharides (DP≥3) on dry weight. GOS may further contain monosaccharides like glucose and galactose, and disaccharides such as lactose, lactulose, and allolactose. The lactose content is generally in the range 0-60 wt %, preferably 0-40 wt %, and most preferably 0-30 wt %; the monosaccharide content is generally in the range 0-20 wt %; based on dry weight. In addition, GOS may contain protein, in an amount of 0-5 wt %.

GOS synthesis typically involves a number of galactosyl transfer processes catalyzed by β-galactosidase (β-D-galactohydrolase; EC 3.2.1.23), which uses lactose as galactosyl donor and lactose or the intermediate GOS species as galactosyl acceptor. Examples of such beta-galactosidase enzymes are *Bacillus circulans, Aspergillus oryzae, Aspergillus niger, Kluyveromyces marxianus, Kluyveromyces fragilis, Sporobolomyces singularis, Lactobacillus fermentum*, and *Papiliotrema terrestris*. The composition of the mixture depends, amongst others, on the enzyme used. For example, a fungal beta-galactosidase derived from *Aspergillus* predominantly produces β1-6 bonds (thus resulting in a GOS preparation that predominantly comprises β1-6 bonds, which may be referred to as "6'-GOS"), while a bacterial beta-galactosidase derived from *Bacillus* predominantly produce β1-4 bonds (resulting in a GOS preparation that predominantly comprises β1-4 bonds, which may also be referred to as "4'-GOS"). In the present invention any type of GOS mixture and, thus, GOS obtained from any type enzyme, can be used.

In addition to GOS, it is possible to add lactose from a separate source, i.e. a source other than GOS. For economic reasons, the weight ratio lactose to total disaccharide plus oligosaccharide content (so, including lactose) in the powder composition of the present invention is preferably as high as possible. However, a too high lactose content increases the risk of lactose crystallization, thereby expelling oil from the droplets of the emulsion during production of the encapsulates.

The human milk oligosaccharide is preferably selected from the group consisting of fucosylated lactoses, sialylated lactoses, tetrasaccharides, and combinations thereof, preferably selected from the group consisting of 2'-fucosyllactose (2'-FL), 3-fucosyllactose (3-FL), 3'-sialyllactose (3'-SL), 6'-sialyllactose (6'-SL), lacto-N-tetraose (LNT), lacto-N-neotetraose (LNnT), and combinations thereof, more preferably being 2'-fucosyllactose (2'-FL) or combination of 2'-FL and one or more additional HMOs, most preferably being 2'-FL.

The powder composition according to the present invention may comprise 5-65 wt % of one single HMO, 5-65 wt % of a combination of one or more HMOs, or 5-65 wt % of a combination of GOS and one or more HMOs.

In addition to HMO(s), it is possible to add lactose. For economic reasons, the weight ratio lactose to HMO in the powder composition of the present invention is preferably as high as possible. However, a too high lactose content increases the risk of lactose crystallization, thereby expelling oil from the droplets of the emulsion during production of the encapsulates.

In addition, the powder composition according to the present invention may comprise one or more antioxidants. In one embodiment, the composition may comprise at least one antioxidant in the matrix surrounding the oil phase; preferred examples of such antioxidants are ascorbates such as sodium ascorbate. Alternatively or in addition, the composition according to the invention may comprise at least one antioxidant in the oil phase, such as citric acid, rosemary, tocopherol, ascorbyl palmitate, and mixtures thereof.

The composition according to the invention can further comprise a stabilizer such as dipotassium phosphate, and/or chelating agents and/or buffering agents such as salts of citrate and/or ortho phosphate. The composition may also comprise a free-flowing aid, such as tricalcium phosphate, if so desired.

In a preferred embodiment, the powder composition according to the invention is a free flowing powder. The term "free-flowing powder" refers to particulate materials that can be poured (e.g., from one vessel having an opening of from about 10 $cm^2$ to 50 $cm^2$ to another vessel of similar dimensions) without substantial clumping of the particles. In detail, the term "free-flowing" is used for a powdered material that is not sticky, and thus has no or hardly any tendency to agglomerate or to adhere to contact surfaces. The so-called angle of repose, θr, is sometimes used as a measure for the flow properties of powders. The angle of repose is the angle that a cone of powder forms between a flat surface when it is poured onto that surface. Typically, for a free-flowing powder θr is low, e.g. smaller than 60° or smaller than 45°, such as 40° or less. Free-flowing powders are sometimes referred to as "dry powders", although the word "dry" in this context does not necessarily imply the absence of water from the composition.

Typically, the powder has a mean particle size of from about 10 μm to about 1000 μm, preferably from about 50 μm to about 800 μm, more preferably from about 90 to 400 μm and most preferably from 100 μm to about 300 μm. Particle sizes can be determined using techniques known to the skilled man, e.g. by using the well-known Coulter Counter. For example, more than 95 wt % of the particles may have a size of less than 800 μm and/or more than 85 wt % of the particles may have a size of less than 500 μm and/or more than 90 wt % of the particles may have a size of greater than 20 μm and/or 65 wt % of the particles may have a size of greater than 200 μm.

The powder form of the composition of the invention preferably has a bulk density of from 200 to 600 g/l, such as from 300 to 500 g/l.

The powder composition according to the present invention can be prepared by preparing an aqueous emulsion of the ingredients, followed by spray-drying the emulsion. In a specifically preferred embodiment, the spray drying is carried out using a Filtermat® spray drying installation. Such spray dryers use nozzle atomization in a co-current tower that directs the semi-dried particles downward onto a moving belt. The material is then gently conveyed as a porous layer to zones of post-drying and cooling resulting in a crisp cake-like structure that breaks up at the end of the belt.

In a preferred embodiment, the oil and all other ingredients are emulsified to a dry matter content of generally 50 to 70 wt %, by adding the oil to an aqueous solution of all other ingredients, followed my homogenization.

It is preferred to perform the emulsification in such a way that an average oil droplet diameter of less than 1 micrometer is obtained. This droplet size can be determined using laser diffraction (e.g. using a Malvern Mastersizer®). Preferably, pre-emulsification is performed at a temperature of 45-65° C. by means of an Ultra Turrax® at 6000 to 10.000 rpm. Subsequently, a two stage high pressure homogeniser can be used (150-250 bar/30-50 bar).

Drying is preferably carried out by spray drying. Conditions for spray drying are known to, or can be readily determined by, those skilled in the art. Spray drying is preferably carried out under conditions such that the resulting powder has a mean particle size of from 20 μm to 800 μm. Suitable results are obtained when the emulsion prepared is fed in a spray dryer by means of a high-pressure pump operating at a pressure of 50 to 200 bar, using a nozzle system for atomisation known to those skilled in the art. The spray dryer operates typically with an inlet temperature of 150-200° C., and an outlet temperature of 60-90° C.

More preferably, to effectively spray dry formulations according to the invention to obtain free flowable powders in good yield, specific spray dry installations are used. Therefore, most preferably, the use of Deck or Filtermat® spray dry installations are used to render the above formulations into free flowing powders with the described powder morphology. Such installations are in general terms similar and known for its mild and versatile drying capabilities. Such types of spray dryer installation can best be described as dryers composed of a section wherein in a first stage the powder is rendered semi-dry (<15% moisture) and dried to the desired final moisture content (typical <5%) in a second stage after the semi dry powder has been collected on a porous moving belt. The mixture may be prepared by combining the above components, for example by mixing and optionally stirring to form an emulsion. The emulsion is then preferably spray dried to a water content of less than 5% by weight (preferably less than 4% by weight). The particulate material (i.e., powder) thus formed is then collected. The composition is preferably packaged in the presence of an inert gas (e.g., nitrogen) and is advantageously stored at a temperature below room temperature, for example from about 5°° C. to about 10° C., prior to use.

The powder composition according to the present invention can be incorporated in food products, preferably in an amount of 0.01% to 20% by weight, preferably from 0.01% to 10% by weight, more preferably from 0.01% to 5% by weight, depending on the nature of the food product. For example, relatively high amounts of the composition may be tolerated in bakery products while smaller amounts are required in certain beverages. Suitable food products include, for example, food supplements, healthy snacks, candies or food bars, sports nutritional products, medical nutritional products, cereals, bakery products (e.g., bread, biscuits or cookies, snack bars), oil-based products (e.g., spreads, salad dressings), dairy products (e.g., milk, reconstitutable milk products, yoghurt, ice cream), formula milk (which are liquids or reconstituted powders fed to infants and young children) and (non-dairy) beverages such as fruit juice.

In a preferred embodiment, the powder composition according to present invention is incorporated in formula milk. The formula milk is selected from the group of infant formulas, follow-up formulas and growing-up formulas. The nutritional composition can be prepared by combining the powder composition according to the invention with a protein source, e.g. whey protein, a further lipid source, a further a carbohydrate source, vitamins, and minerals, and/or bovine milk.

Said additional lipid source may be any lipid or fat suitable for use in formula milk. Preferred fat sources include (anhydrous) milk fat, canola oil, coconut oil, palm kernel oil, soybean oil, palm olein, palm oil, (high oleic) sunflower oil, (high oleic) safflower oil, and combinations thereof.

Examples of vitamins and minerals that are preferably present in formula milk are vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form.

Examples of carbohydrates that are preferably present in formula milk are lactose, non-digestible oligosaccharides such as galacto-oligosaccharides (GOS) and/or fructo-oligosaccharides (FOS) and human milk oligosaccharides (HMOs). Part of the GOS and/or HMO and optionally lactose is added via the powder composition of the present invention; any further GOS, HMO, and lactose that would be required will be added separately to the formula milk.

If necessary, the formula milk may contain emulsifiers and stabilisers such as soy lecithin, citric acid esters of mono-and di-glycerides, and the like. It may also contain other substances which may have a beneficial effect such as lactoferrin, nucleotides, nucleosides, and the like.

EXAMPLES

Example 1

23.8 kg Vivinal® GOS (ex-FrieslandCampina), 8.6 kg lactose, 5.3 kg sodium caseinate, 2.1 kg sodium ascorbate, 1.3 kg whey protein concentrate, and 0.7 kg mono-and diglycerides of fatty acids (E471) were dissolved in 43.9 kg water.

28 kg DHA fish oil was subsequently mixed and homogenized in this solution, resulting in an emulsion. The emulsion was pasteurized (75° C., 15 sec) and subsequently spray-dried on a Filtermat® installation.

The resulting product was incorporated in an infant formula base powder (ex-FrieslandCampina) by dry-blending, in a concentration of 460 mg DHA per 100 g base powder. The resulting product was stored under nitrogen at a temperature of 20° C. for 4 months.

Comparative Example A

Example 1 was repeated, except that the GOS and lactose were replaced by 32.4 kg glucose syrup.

Example 2

The infant formula base powders of Example 1 and Comparative Example Awere submitted to a testing panel of 6 people. Each sample was prepared by stirring 13 g into 87 ml water of 40° C. The panel members gave the powders a score ranging from 1 (extreme off-taste) to 5 (no off-taste).

The average score of the powder of Comparative Example A was 2.5; the average score of the powder of Example 1 was 3.8, illustrating that the powder according to the present invention suffered less from oxidation during the 4 months storage time than the comparative powder.

Example 3

21.0 kg Aequival® 2'-FL powder (ex-FrieslandCampina), 5.5 kg sodium caseinate, 1.7 kg sodium ascorbate, 1.4 kg whey protein concentrate, and 0.6 kg mono-and diglycerides of fatty acids (E471) were dissolved in 41.6 kg water.

27.9 kg DHA fish oil was subsequently mixed and homogenized in this solution, resulting in an emulsion. The emulsion was pasteurized (76° C., 15 sec) and subsequently spray-dried on a Filtermat® installation.

The resulting powder was stored under nitrogen for 15 months at 20° C., and tested at the beginning and end of shelf life by an internal FrieslandCampina taste panel. 0.5 g of powder was stirred into 50 ml of semi-skimmed milk of 40° C. and tasted within 0.5 hour. The panel members gave the powders a score ranging from 1 (extreme off-taste) to 5 (no off-taste).

At the beginning of shelf life, the average score was 5.0; at the end of the 15 months shelf-life the average score was 4.0. These scores were better or comparable with those of a comparative product containing glucose syrup (Comparable Example B, below).

Comparative Example B 31.0 kg glucose syrup, 8.0 kg sodium caseinate, 2.6 kg sodium ascorbate, 2.0 kg whey protein concentrate, and 0.9 kg mono-and diglycerides of fatty acids (E471) were dissolved in 62.5 kg water.

42.7 kg DHA fish oil was subsequently mixed and homogenized in this solution, resulting in an emulsion. The emulsion was pasteurized (75° C., 15 sec) and subsequently spray-dried on a Filtermat® installation.

At the beginning of shelf life, the average score was 4.1; at the end of the 15 months shelf-life the average score was 3.9.

The invention claimed is:

1. A powder composition comprising, based on the total weight of the powder:

20-55 wt % of an oxidation sensitive edible oil encapsulated in a matrix comprising, based on the total weight of the power:

10-20 wt % of at least one emulsifier selected from protein and starch, and 20-60 wt % galacto-oligosaccharide (GOS) and/or one or more human milk oligosaccharides (HMOs).

2. The powder composition according to claim 1 wherein the oxidation sensitive edible oil comprises polyunsaturated fatty acids in a form of free acids, esters, or mixtures thereof.

3. The powder composition according to claim 1 wherein the at least one emulsifier is selected from caseinates, whey protein, and compositions thereof.

4. The powder composition according to claim 1 wherein the galacto-oligosaccharide (GOS) comprises 40-100 wt % oligosaccharides (DP≥3), based on dry weight.

5. The powder composition according to claim 1 wherein the galacto-oligosaccharide (GOS) comprises 0-60 wt % lactose based on dry weight.

6. The powder composition according to claim 5, wherein the galacto-oligosaccharide (GOS) comprises 0-40 wt % lactose based on dry weight.

7. The powder composition according to claim 5, wherein the galacto-oligosaccharide (GOS) comprises 0-30 wt % lactose based on dry weight.

8. The powder composition according to claim 1 wherein the one or more human milk oligosaccharides (HMOs) is selected from the group consisting of fucosylated lactoses, sialylated lactoses, tetrasaccharides, and combinations thereof.

9. A process for the preparation of the powder composition according to claim 1 comprising the steps of:

(i) preparing an aqueous emulsion comprising said oxidation sensitive edible oil, said at least one emulsifier, and a carbohydrate source, and (ii) spray-drying the emulsion.

10. A food product comprising the powder composition according to claim 1.

11. The food product according to claim 10 wherein the food product comprises 0.01-20 wt % of the powder composition.

12. The food product according to claim 10 wherein the food product is a formula milk selected from an infant formula, a follow-up formula, or a growing-up formula.

13. The food product according to claim 10 wherein the food product is selected from the group consisting of food supplements, snacks, candies, food bars, sports nutritional products, medical nutritional products, cereals, bakery products, oil-based products, dairy products, and beverages.

14. The powder composition according to claim 2 wherein the polyunsaturated fatty acids are long-chain polyunsaturated fatty acids.

15. The powder composition according to claim 1 wherein the oxidation sensitive edible oil comprises arachidonic acid (ARA) and/or docosahexanoic acid (DHA).

16. The powder composition according to claim 1 wherein the galacto-oligosaccharide (GOS) comprises 50-90 wt %, oligosaccharides (DP≥3), based on dry weight.

17. The powder composition according to claim 1 wherein the galacto-oligosaccharide (GOS) comprises 60-80 wt % oligosaccharides (DP≥3), based on dry weight.

18. The powder composition according to claim 8 wherein the one or more human milk oligosaccharides (HMOs) is selected from the group consisting of 2'-fucosyllactose (2'-FL), 3-fucosyllactose (3-FL), 3'-sialyllactose (3'SL), 6'-sialyllactose (6'-SL), lacto-N-tetraose (LNT), lacto-N-neotetraose (LNnT), and combinations thereof, more preferably selected from 2'-fucosyllactose (2'-FL) or combination of 2'-FL and one or more additional HMOs, most preferably being 2'-FL.

19. The powder composition accoring to claim 8 wherein the one or more human milk oligosaccharides (HMOs) is selected from the group consisting of 2'-fucosyllactose (2'-FL) or combination of 2'-FL and one or more additional HMOs.

* * * * *